United States Patent
Palazzolo et al.

[15] 3,707,296
[45] Dec. 26, 1972

[54] MODIFIED PHENOLIC RESIN SYSTEM AND LAMINATES MADE THEREFROM

[72] Inventors: Salvatore E. Palazzolo, Hampton; Harold O. McCaskey, Allendale, both of S.C.

[73] Assignee: Westinghouse Electric Corporation, Pittsburgh, Pa.

[22] Filed: Jan. 9, 1970

[21] Appl. No.: 1,749

[52] U.S. Cl............280/11.13 L, 161/246, 260/839
[51] Int. Cl..........................................A63c 5/12
[58] Field of Search.....280/11.13; 161/246; 260/839

[56] References Cited

UNITED STATES PATENTS

| | | | |
|---|---|---|---|
| 2,331,744 | 10/1943 | Swain et al. | 260/19 |
| 2,801,198 | 7/1957 | Morris et al. | 161/246 |
| 2,387,256 | 10/1945 | Groten | 260/839 |
| 3,070,572 | 12/1962 | Oland et al. | 260/839 |

FOREIGN PATENTS OR APPLICATIONS

| | | | |
|---|---|---|---|
| 390,760 | 8/1965 | Switzerland | 280/11.13 L |
| 1,299,263 | 6/1962 | France | 280/11.13 LM |
| 1,457,826 | 9/1966 | France | 280/11.13 L |

*Primary Examiner*—Benjamin Hersh
*Assistant Examiner*—Milton L. Smith
*Attorney*—F. Shapoe, A. Mich, Jr. and D. P. Cillo

[57] ABSTRACT

A laminate, that can be used as an exterior, refinishable surface for snow skis, comprises a plurality of plastic resin impregnated bonded paper sheets, each having been impregnated with a solution of a melamine-formaldehyde, phenol-formaldehyde resinous admixture which contains from about 10 to 70 weight percent melamine-formaldehyde resin solids based on phenol-formaldehyde resin solids.

12 Claims, 2 Drawing Figures

PATENTED DEC 26 1972 3,707,296
FIG.1.
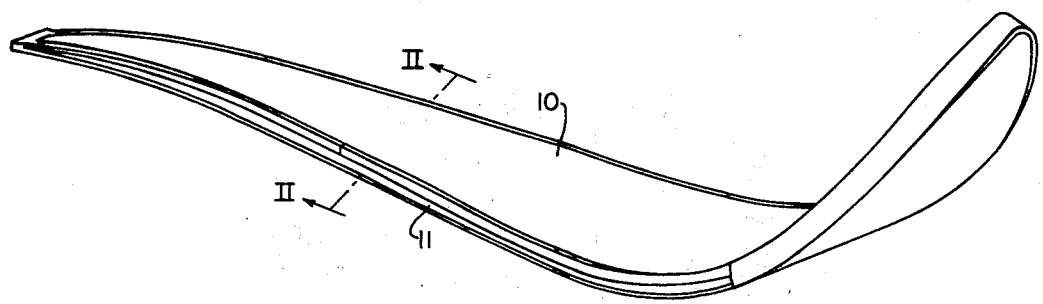
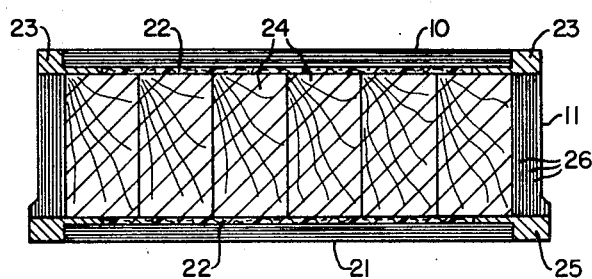
FIG.2.
WITNESSES
Theodore F. Wrobel
James F. Young
INVENTORS
Salvatore E. Palazzolo and
Harold O. McCaskey, Jr.
BY Daniel P. Cillo
ATTORNEY

MODIFIED PHENOLIC RESIN SYSTEM AND LAMINATES MADE THEREFROM

BACKGROUND OF THE INVENTION

Most of the black colored snow skis manufactured today contain a black phenolic high pressure laminate used as a top surfacing material and as a sidewall material. The top surface is usually a thin laminate, 0.020 inch – 0.030 inch thick produced by impregnating kraft paper with a black pigmented phenolic resin. A sandwich of these impregnated papers are then molded into a solid laminate under heat and pressure. The thicker sidewall material is usually produced in the same manner by simply combining enough impregnated paper into one laminate to give the desired thickness. The sidewall thickness is usually one-eighth inch thick.

The primary requirements for these laminates are that they must be refinishable after being nicked or scratched, water resistant, heat resistance and flexible enough to withstand the ski manufacturer's process before and after fabrication. Most of the high pressure laminates being used meet all the physical properties required except refinishability. Most of the laminates upon refinishing show laminations within the laminate as objectionable lines.

SUMMARY OF THE INVENTION

We have found a melamine modified, phenolic resin that when cured, properly possesses excellent refinishability and is water and heat resistant. A laminate produced with this resin admixture meets all the physical property requirements for snow ski top surfaces and sidewalls.

BRIEF DESCRIPTION OF THE DRAWINGS

For a better understanding of the invention reference may be made to the exemplary embodiment shown in the accompanying drawings in which:

FIG. 1 shows, in three dimensional view, a ski having the melamine modified phenolic resin impregnated paper sheet laminate of this invention as the top surface and sidewall surface; and FIG. 2 shows, in a cross section, the ski of FIG. 1, including the top surface, sidewall and base laminations of resin impregnated paper sheets.

DESCRIPTION OF THE PREFERRED EMBODIMENTS

Referring now to the drawings, FIG. 1 shows a type of snow ski having the melamine modified phenolic resin impregnated laminate of this invention as the ski top surface 10 and sidewall 11.

FIG. 2 shows a cross sectional view of the ski. A lamination of a plurality of bonded, melamine modified phenolic resin impregnated, color pigmented kraft paper sheets made in accordance with this invention, comprise the ski top surface 10, sidewall 11 and can also be used for the base 21.

Generally, skis are made by a sandwich construction, wherein the top surface 10 and bottom base 21 can cover fiber-glass laminations 22. On both sides of the top fiberglass layer are structural strips 23 of a metal, generally aluminum. These metal strips also serve as top edge protectors above the sidewalls 11. The flexible core 24 of the ski is surrounded by the top surface, base and sidewalls between the top surface and base, and can be of a material such as multi-laminated wood. The lower fiberglass lamination can be covered by the base 21 which can fit between hardened-metal bottom edges 25.

The ski top surface 10, sidewall 11 and base 21 can comprise a plurality of bonded, laminated core sheets 26 of kraft paper, impregnated with a plastic material comprising the melamine modified phenolic resin admixture of this invention. These sheets can be assembled and molded under pressures of about 1,200 to 1,500 psi at about 250° to 325°F to produce a unitary structure, cooled, and machined, to produce the consolidated refinishable exterior ski surfaces shown as 10, 11 and 21 in the drawings.

The melamine modified phenolic resin system used to impregnate the kraft paper core sheets 26, is a solution of a melamine-formaldehyde, modified, ammonia catalyzed, phenol-formaldehyde resinous admixture. It is the resin admixture that gives the bonded, impregnated, kraft paper laminates and the ski surfaces, for which they may be used, refinishable properties.

Ordinarily, in the laminating art, melamine-formaldehyde and phenol-formaldehyde resins are not used in combination because the melamine resin requires an acid catalyst and the penolic resin requires an alkaline catalyst. We found however, that the combination of both resins were required to give a good combination of properties for snow ski surface applications. The phenol-formaldehyde resin is necessary for toughness and flexibility whereas the melamine-formaldehyde resin is necessary for hardness and high gloss properties. We found that too much phenol-formaldehyde resin in the admixture gave a laminate that would not be buffable and refinishable and that too much melamine-formaldehyde resin in the admixture gave too brittle a laminate. We found the critical ratio to be an admixture of from 10 to 70 weight percent melamine-formaldehyde resin (100 percent solids) based on phenol-formaldehyde resin (100 percent solids). That is, the admixture must contain 0.1 parts by weight of melamine-formaldehyde resin (100 percent solids) for each 0.9 parts by weight of phenol-formaldehyde resin (100 percent solids) to give a 10 weight percent ratio of melamine-formaldehyde based on phenolic resin, and the admixture must contain 0.7 parts by weight of melamine-formaldehyde resin (100 percent solids) for each 0.3 parts by weight of phenol-formaldehyde resin (100 percent solids) to give a 70 weight percent ratio of melamine-formaldehyde based on phenolic resin. The preferred ratio is an admixture of from about 20 to 40 weight percent melamine-formaldehyde resin (100 percent solids) based on phenol-formaldehyde resin (100 percent solids).

We found a satisfactory weight percent resin to kraft paper ratio to be between 0.75 resin : 1.0 paper to 2.0 resin : 1.0 paper with a preferred ratio of between about 1.25 resin : 1.0 paper to 1.75 resin : 1.0 paper.

The following example sets forth a specific melamine modified, phenolic resin admixture that may be employed in a suitable solvent, to impregnate kraft core stock paper sheets for use as refinishable laminates, and especially as refinishable, flexible, exterior ski surfaces that can withstand ski manufacturing processes.

EXAMPLE I

In a steam heated reaction vessel with attached vacuum lines and refluxing column, 1,042 pounds of molten phenol (about 99 percent solids) was added, followed by 981 pounds of 37 weight percent stabilized formaldehyde solution (about 37 percent solids) and 49 pounds of ammonia (26° Be). The stirrer was started and the mixture was reacted and heated until the batch reached reflux temperature (98° to 100°C). The reaction was continued at reflux temperature until the batch began to lose water solubility. This was determined by a change in the color of the batch from brown to an off-white milky color. This took about 45 minutes and yielded a phenolic resin having a solids content of about 55 percent.

At this point the batch was cooled to 70°C and 506 pounds of spray dried, powdered, melamine resin (about 99 percent solids) was added. The spray dried melamine resin was an unmodified melamine-formaldehyde resin with a mole ratio of formaldehyde to melamine of from 1.5 : 1 to 2 : 1 and when added, took up water from the phenol-formaldehyde resinous composition. This gave a resinous admixture comprising approximately 25–40 weight percent melamine-formaldehyde resin solids based on phenol-formaldehyde resin solids.

After the addition of the melamine-formaldehyde resin, vacuum dehydration was begun, using from 20 to 24 inches of vacuum and enough heat to boil the batch vigorously. The vacuum dehydration was continued for about 1 hour, until about 317 pounds of distillate was removed. At this point the batch was immediately cooled, the vacuum released and 945 pounds of methanol solvent was added to dilute the resin system to a solution of about 50 weight percent solids content. About 1 percent by weight of a fatty alcohol phosphate release agent was then added, based on the solids content of the resin system.

This resin solution was used to impregnate a plurality of black pigmented 110 pound basis weight kraft paper sheets to a resin to paper ratio of 1.7 : 1. Three of these impregnated kraft paper sheets (38 inches × 18 inches) were then assembled and molded under 1,200 to 1,500 psi pressure at 300°F for 15 minutes to consolidate the assembly to a unitary structure. The resulting product was a black, resin impregnated, bonded laminate about 0.025 inch (25 mils) thick.

Samples of this laminate (6 inches × 9 inches) withstood continuous boiling in water for three weeks without delamination or blistering. Other samples of this laminate withstood temperatures of 350°F for 10 minutes without delamination or blistering. The laminate will refinish throughout its entire thickness without showing objectionable lamination lines. The gloss obtained from our laminate after refinishing and buffing was noticeably improved over the gloss from a laminate produced with an unmodified phenolic resin system.

We have also fabricated samples of these laminates (4 inches × 8 inches) to 0.085 inch aluminum sheets using 350°F temperatures and 100 psi pressure for 10 minutes without blistering. We have cut through the entire thickness of these laminates at an approximate 30° angle, sanded the cut surface with fine sandpaper and buffed the cut surface to a high gloss having no color difference throughout the thickness of the laminate, and having no noticeable indications of laminations within the laminate. Laminates produced with this resin system have been fully tested and approved for top surfaces and sidewalls of snow skis.

In addition to using pigmented paper, the color of the laminate can be controlled by the addition of pigments into the resin system before paper impregnation. Usually no more than 1 percent pigment based on resin solids are required. Although the preferred catalyst was ammonia because it gives good water resistance characteristics, other compatible alkali catalysts such as calcium carbonate and sodium hydroxide may be used. Also, a wide variety of solvent such as ethanol and isopropyl alcohol among others may be used to dilute the resinous admixture to a suitable solids content of between about 45 to 60 percent solids.

We claim:

1. A resin impregnating solution, for refinishable laminates, consisting essentially of melamine-formaldehyde resin, phenol-formaldehyde resin and alkali catalyst in a solvent, to provide a solution having a solids content of between about 45 and 60 percent, said melamine formaldehyde resin being present in the amount of from 10 to 70 weight percent melamine-formaldehyde resin solids based on phenol-formaldehyde resin solids and wherein the melamine-formaldehyde resin comprises a resin having a mole ratio of formaldehyde:melamine of from about 1.5:1 to 2:1.

2. The resin solution of claim 1 wherein the catalyst is selected from the group consisting of ammonia, calcium carbonate and sodium hydroxide, the solvent is selected from the group consisting of methanol, ethanol and isopropyl alcohol, the melamine resin being present in the amount of from about 20 to 40 weight percent melamine-formaldehyde resin solids based on phenol-formaldehyde resin solids.

3. A refinishable laminate comprising a plurality of bonded, resin impregnated paper sheets, impregnated with a catalyzed melamine-formaldehyde resin, phenol-formaldehyde resin admixture, said admixture comprising from 10 to 70 weight percent melamine-formaldehyde resin solids based on phenol-formaldehyde resin solids, wherein the weight percent resin: paper is a ratio between 0.75 to 2.0:1.0.

4. The refinishable laminate of claim 3 wherein the admixture comprises from about 20 to 40 weight percent melamine-formaldehyde resin solids based on phenol-formaldehyde resin solids.

5. The refinishable laminate of claim 4 wherein the paper sheets are color pigmented kraft paper sheets, the catalyst in the admixture is selected from the group consisting of ammonia, calcium carbonate and sodium hydroxide and the melamine-formaldehyde resin comprises a resin having a mole ratio of formaldehyde : melamine of from about 1.5 :1 to 2 : 1.

6. A method of making a refinishable laminate comprising a plurality of bonded sheets comprising the steps of:

1. mixing a melamine-formaldehyde resin with a phenol-formaldehyde resin and a catalyst to form a resin admixture comprising from 10 to 70 weight percent melamine-formaldehyde resin solids based on phenol-formaldehyde resin solids;

2. impregnating paper sheets with a solution of the admixture to a resin to paper ratio of between 0.75:1 to 2:1;

3. preparing a stacked assembly comprising a plurality of said resin impregnated sheets; and
4. heat and pressure consolidating the assembly into a unitary structure.

7. The method of claim 6 wherein the resin to paper ratio is between about 1.25 : 1 to 1.75 : 1, the admixture comprises from about 20 to 40 weight percent melamine-formaldehyde resin solids based on phenol-formaldehyde resin solids, the catalyst in the resin admixture is selected from the group consisting of ammonia, calcium carbonate and sodium hydroxide and the melamine-formaldehyde resin comprises a resin having a mole ratio of formaldehyde : melamine of from about 1.5 : 1 to 2 : 1.

8. The method of claim 7 wherein the admixture contains ammonia catalyst and the stacked assembly is consolidated at between about 1,200 to 1,500 psi and 250° to 325°F.

9. The method of claim 7 wherein the admixture is in a solution of a solvent selected from the group consisting of methanol, ethanol and isopropyl alcohol and the paper sheets are color pigmented kraft paper sheets.

10. A snow ski comprising a flexible core surrounded by a laminated top surface, base surface, and sidewalls between the top surface and base surface, the improvement being refinishable top surface and sidewall laminations comprising a plurality of bonded, resin impregnated paper sheets impregnated with a catalyzed, melamine-formaldehyde resin, phenol-formaldehyde resin admixture, said resin admixture comprising from 10 to 70 weight percent melamine-formaldehyde resin solids based on phenol-formaldehyde resin solids and the weight percent resin:paper is a ratio between 0.75 to 2.0:1.0.

11. The snow ski of claim 10 also having a refinishable base surface comprising a plurality of bonded, resin impregnated paper sheets, the sheets of the top surface, base surface and sidewall being impregnated with the admixture, wherein the admixture comprises from about 20 to 40 weight percent melamine-formaldehyde resin solids based on phenol-formaldehyde resin solids.

12. The snow ski of claim 10 wherein the paper sheets are color pigmented kraft paper sheets, the catalyst in the resin admixture is selected from the group consisting of ammonia, calcium carbonate and sodium hydroxide and the melamine-formaldehyde resin comprises a resin having a mole ratio of formaldehyde:melamine of from about 1.5:1 to 2:1.

* * * * *